United States Patent
Yoshida

(10) Patent No.: US 10,477,038 B2
(45) Date of Patent: Nov. 12, 2019

(54) IMAGE PROCESSING APPARATUS, IMAGE PROCESSING SYSTEM, AND RECORDING MEDIUM

(71) Applicant: Makoto Yoshida, Kanagawa (JP)

(72) Inventor: Makoto Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/929,013

(22) Filed: May 14, 2018

(65) Prior Publication Data

US 2018/0332181 A1 Nov. 15, 2018

(30) Foreign Application Priority Data

May 15, 2017 (JP) .................................. 2017-096614
Apr. 24, 2018 (JP) .................................. 2018-083445

(51) Int. Cl.
*H04N 1/00* (2006.01)
*G06Q 30/02* (2012.01)
*H04N 1/60* (2006.01)

(52) U.S. Cl.
CPC ..... *H04N 1/00183* (2013.01); *G06Q 30/0283* (2013.01); *H04N 1/00161* (2013.01); *H04N 1/6066* (2013.01); *H04N 1/6097* (2013.01)

(58) Field of Classification Search
CPC ........... H04N 1/00183; H04N 1/00161; H04N 1/6066; H04N 1/6097; G06Q 30/0283
USPC ....................................................... 358/1.9
See application file for complete search history.

(56) References Cited

U.S. PATENT DOCUMENTS

| | | | | |
|---|---|---|---|---|
| 2003/0214568 | A1* | 11/2003 | Nishikawa | B41J 29/393 347/116 |
| 2006/0001891 | A1* | 1/2006 | Yoshida | H04N 1/047 358/1.9 |
| 2006/0164700 | A1* | 7/2006 | Hayashi | H04N 1/6033 358/518 |
| 2008/0246982 | A1* | 10/2008 | Kaneko | H04N 1/54 358/1.9 |

(Continued)

FOREIGN PATENT DOCUMENTS

JP 2006-227444 8/2006
JP 2011-013875 1/2011

(Continued)

*Primary Examiner* — Allen H Nguyen
(74) *Attorney, Agent, or Firm* — Oblon, McClelland, Maier & Neustadt, L.L.P.

(57) ABSTRACT

An image processing apparatus includes circuitry to acquire input image data, perform image conversion on the input image data to generate the output image data corresponding to each of a plurality of output conditions, and calculate a color feature amount that is a change amount of color characteristics of each pixel from the input image data and the output image data before and after the image conversion. The circuitry calculates cost information indicating cost of the output image data corresponding to each of the plurality of output conditions, based on the plurality of output conditions and the output image data, and calculates cost effectiveness with reference to the color feature amount, the cost information, and a weighting table in which weights for items of the plurality of output conditions are set, to determine one output condition of the plurality of output conditions to be used for output.

9 Claims, 14 Drawing Sheets

(56) References Cited

U.S. PATENT DOCUMENTS

| | | | |
|---|---|---|---|
| 2011/0019214 A1* | 1/2011 | Taya | G03G 15/01 |
| | | | 358/1.9 |
| 2013/0070268 A1 | 3/2013 | Yoshida et al. | |
| 2013/0242350 A1 | 9/2013 | Yoshida et al. | |
| 2013/0250365 A1 | 9/2013 | Yoshida et al. | |
| 2013/0265608 A1 | 10/2013 | Yoshida et al. | |
| 2015/0177671 A1 | 6/2015 | Yoshida et al. | |
| 2015/0185678 A1 | 7/2015 | Yoshida et al. | |
| 2017/0094116 A1 | 3/2017 | Yoshida | |

FOREIGN PATENT DOCUMENTS

| | | |
|---|---|---|
| JP | 2012-142890 | 7/2012 |
| JP | 2012-256976 | 12/2012 |
| JP | 2014-072751 | 4/2014 |

\* cited by examiner

FIG. 5A

| EFFECT | COEFFICIENT | WEIGHT VALUE |
|---|---|---|
| COLOR DIFFERENCE | $\alpha_1$ | 0.80 |
| GAMUT VOLUME | $\alpha_2$ | 0.20 |

FIG. 5B

| COST | COEFFICIENT | WEIGHT VALUE |
|---|---|---|
| OUTPUT DEVICE | $\beta_1$ | 0.05 |
| PRODUCTIVITY | $\beta_2$ | 0.05 |
| PRINT MODE | $\beta_3$ | 0.10 |
| COLOR MATERIAL | $\beta_4$ | 0.30 |
| PRE-COATING MATERIAL | $\beta_5$ | 0.10 |
| POST-COATING MATERIAL | $\beta_6$ | 0.10 |
| RIP | $\beta_7$ | 0.00 |
| RESOLUTION | $\beta_8$ | 0.00 |
| SHEET | $\beta_9$ | 0.30 |

FIG. 9A

| OUTPUT DEVICE | COST VALUE |
|---|---|
| PRINTER ENVIRONMENT A | 200 |
| PRINTER ENVIRONMENT B | 100 |
| PRINTER ENVIRONMENT C | 50 |

FIG. 9B

| PRODUCTIVITY (PER SHEET) | COST VALUE |
|---|---|
| SETTING OF 80 ppm | 10 |
| SETTING OF 90 ppm | 9 |
| SETTING OF 100 ppm | 8 |
| SETTING OF 110 ppm | 7 |

FIG. 9C

| PRINT MODE (PER SHEET) | COST VALUE |
|---|---|
| MODE A | 0 |
| MODE B | 500 |
| MODE C | 1200 |

FIG. 9D

| COLOR MATERIAL (PER LITER) | COST VALUE |
|---|---|
| Black | 100 |
| Cyan | 200 |
| Magenta | 200 |
| Yellow | 200 |
| Green | 500 |
| White | 800 |
| Clear | 1000 |

FIG. 9E

| PRE-COATING MATERIAL (PER LITER) | COST VALUE |
|---|---|
| PRE-COATING MATERIAL A | 1500 |
| PRE-COATING MATERIAL B | 2000 |

FIG. 9F

| POST-COATING MATERIAL (PER LITER) | COST VALUE |
|---|---|
| POST-COATING MATERIAL A | 500 |
| POST-COATING MATERIAL B | 1000 |

FIG. 9G

| RIP | COST VALUE |
|---|---|
| COMPANY A (ver. 1) | 100 |
| COMPANY A (ver. 2) | 150 |
| COMPANY B (ver. 2.1) | 100 |
| COMPANY C (ver. 3) | 200 |

FIG. 9H

| RESOLUTION | COST VALUE |
|---|---|
| 600 dpi | 300 |
| 1200 dpi | 300 |
| 2400 dpi | 300 |

FIG. 9I

| SHEET (PER SHEET) | COST VALUE |
|---|---|
| SHEET A | 1 |
| SHEET B | 2 |
| SHEET C | 5 |
| SHEET D | 10 |

FIG. 10A

| ITEM NO. | ITEM | OUTPUT CONDITION A | COST VALUE | COMMENT |
|---|---|---|---|---|
| #1 | OUTPUT DEVICE | PRINTER ENVIRONMENT B | 100 | |
| #2 | PRODUCTIVITY | SETTING OF 110 ppm | 7 | PER SHEET |
| #3 | PRINT MODE | MODE A | 0 | |
| #4 | COLOR MATERIAL | CMYK | 700 | PER LITER |
| #5 | PRE-COATING MATERIAL | PRE-COATING MATERIAL B | 2000 | PER LITER |
| #6 | POST-COATING MATERIAL | NOT USED | 0 | PER LITER |
| #7 | RIP | COMPANY B (ver. 2.1) | 100 | |
| #8 | RESOLUTION | 1200 dpi | 300 | |
| #9 | SHEET | SHEET C | 5 | PER SHEET |

FIG. 10B

| ITEM NO. | ITEM | OUTPUT CONDITION A | COST VALUE | COMMENT |
|---|---|---|---|---|
| #1 | OUTPUT DEVICE | PRINTER ENVIRONMENT B | 100 | |
| #3 | PRINT MODE | MODE A | 0 | |
| #7 | RIP | COMPANY B (ver. 2.1) | 100 | |
| #8 | RESOLUTION | 1200 dpi | 300 | |
| TOTAL | | | 500 | |

FIG. 10C

| ITEM NO. | ITEM | OUTPUT CONDITION A | COST VALUE | COMMENT |
|---|---|---|---|---|
| #2 | PRODUCTIVITY | SETTING OF 110 ppm | 70 | TOTAL PER JOB |
| #4 | COLOR MATERIAL | CMYK | 5000 | TOTAL PER JOB |
| #5 | PRE-COATING MATERIAL | PRE-COATING MATERIAL B | 1000 | TOTAL PER JOB |
| #6 | POST-COATING MATERIAL | NOT USED | 0 | |
| #9 | SHEET | SHEET C | 50 | TOTAL PER JOB |
| TOTAL | | | 6120 | TOTAL PER JOB |

IMAGE PROCESSING APPARATUS, IMAGE PROCESSING SYSTEM, AND RECORDING MEDIUM

CROSS-REFERENCE TO RELATED APPLICATIONS

This patent application is based on and claims priority pursuant to 35 U.S.C. § 119(a) to Japanese Patent Application Nos. 2017-096614, filed on May 15, 2017, and 2018-083445, filed on Apr. 24, 2018 in the Japan Patent Office, the entire disclosure of which is hereby incorporated by reference herein.

BACKGROUND

Technical Field

Aspects of the present disclosure relate to an image processing apparatus, an image processing system, a non-transitory recording medium storing an information processing program.

Related Art

In an image output apparatus of an inkjet or electrophotographic method, various output conditions (for example, model, productivity, print mode, color material, pre-coating, post-coating, raster image processor (RIP), resolution, and sheet) can be set. There are differences in effect on image quality (for example, size of color gamut, color reproducibility of specific color, etc.) obtained between the output conditions. In addition, since the required expenses are different for the output based on the output conditions, a technique is known that allows the selection of output condition according to the target cost.

SUMMARY

In an aspect of the present disclosure, there is provided an image processing apparatus that includes circuitry to acquire input image data, perform image conversion on the input image data to generate the output image data corresponding to each of a plurality of output conditions, and calculate a color feature amount that is a change amount of color characteristics of each pixel from the input image data and the output image data before and after the image conversion, calculates cost information indicating cost of the output image data corresponding to each of the plurality of output conditions, based on the plurality of output conditions and the output image data, and calculates cost effectiveness with reference to the color feature amount, the cost information, and a weighting table in which weights for items of the plurality of output conditions are set, to determine one output condition of the plurality of output conditions to be used for output.

In another aspect of the present disclosure, there is provided an image processing system that includes an image output apparatus and an image processing apparatus that generates output image data to be output by the image output apparatus. The image processing apparatus includes circuitry to acquire input image data, perform image conversion on the input image data to generate the output image data corresponding to each of a plurality of output conditions, calculate a color feature amount that is a change amount of color characteristics of each pixel from the input image data and the output image data before and after the image conversion, calculate cost information indicating cost of the output image data corresponding to each of the plurality of output conditions, based on the plurality of output conditions and the output image data, and calculate cost effectiveness with reference to the color feature amount, the cost information, and a weighting table in which weights for items of the plurality of output conditions are set, to determine one output condition of the plurality of output conditions to be used for output. The image output apparatus receives the output image data from the image processing apparatus and outputs the output image data received from the image processing apparatus.

In still another aspect of the present disclosure, there is provided a non-transitory recording medium storing an image processing program to cause a computer to execute acquiring input image data, performing image conversion on the input image data to generate output image data corresponding to each of a plurality of output conditions, calculating a color feature amount that is a change amount of color characteristics of each pixel from the input image data and the output image data before and after the image conversion, calculating cost information indicating cost of the output image data corresponding to each of the plurality of output conditions, based on the plurality of output conditions and the output image data, and calculating cost effectiveness with reference to the color feature amount, the cost information, and a weighting table in which weights for items of the plurality of output conditions are set, to determine one output condition of the plurality of output conditions to be used for output.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A and 5B are illustrations of examples of a weighting table;

FIG. 9A through 9I are illustrations of examples of a cost table;

FIGS. 10A through 10C are illustrations of calculated cost information;

Figure 1:
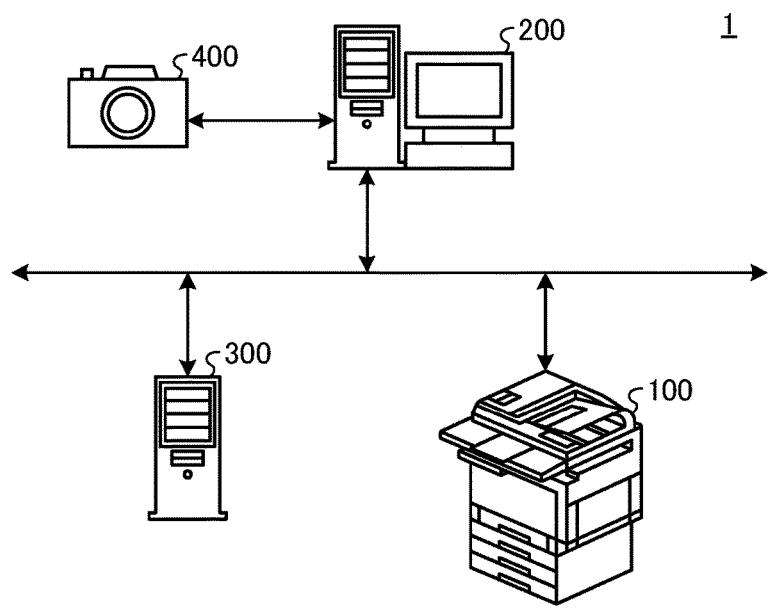
FIG. 1 is an illustration of an example of an overall configuration of an image processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, the details of each embodiment will be described with reference to the attached drawings. In describing the specification and the drawings according to the respective embodiments, the same reference numerals will be given to the constituent elements having substantially the same functional arrangement to omit redundant explanation.

Embodiments of the present disclosure are described in detail below with reference to the accompanying drawings. In an embodiment described below, an image processing system for commercial printing is taken as an example. A general-purpose information processing apparatus, such as a personal computer (PC) in an image processing system acquires target image data (output target data) to be subjected to image formation (output). Based on output conditions, the image data is color-converted according to the color gamut characteristics of an image forming apparatus, and is converted into a format for image formation output, such as CMYK (cyan, magenta, yellow, and black). The converted image data is transmitted to the image forming apparatus and output (printed).

FIG. 1 is an illustration of an example of an overall configuration of an image processing system according to the present embodiment. As illustrated in FIG. 1, an image processing system 1 according to the present embodiment includes, e.g., an image forming apparatus 100, a PC 200 as a controller terminal, a file server 300, and a digital camera 400. The image forming apparatus 100, the PC 200, and the file server 300 are connected via a network as illustrated in FIG. 1.

The image forming apparatus 100 includes an image forming engine of, e.g., an inkjet or electrophotographic system, and outputs (prints) an image on a sheet according to image data transmitted from the PC 200. The image forming apparatus 100 is an example of an image output apparatus.

As described above, the PC 200 acquires target image data to be subjected to image formation and output and performs image processing, such as color matching, based on output conditions. The PC 200 according to the present embodiment has a function of displaying a screen that allows an operator to easily confirm the change in color tone of an image before and after performing the color matching. Note that the PC 200 is an example of an image processing apparatus.

Similarly with the PC 200, the file server 300 is constituted by an information processing apparatus and provides a storage area accessible via the network. In the present embodiment, the file server 300 stores image data that can be output, and functions as an image input device that provides image data in response to access from the PC 200.

Similarly with the file server 300, the digital camera 400 is an imaging device of image information and functions as an image input device that provides the PC 200 with image data that can be output. In addition to the file server 300 and the digital camera 400 illustrated in FIG. 1, for example, a scanner can be operated as an image input device.

Figure 2:
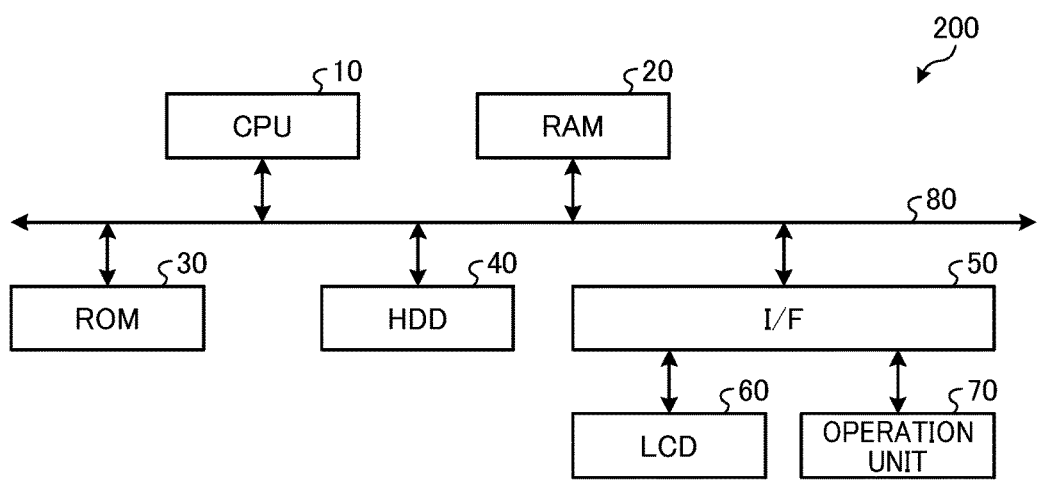
FIG. 2 is a hardware configuration diagram of a personal computer (PC) according to an embodiment of the present disclosure.

Next, a hardware configuration of the PC 200 according to the present embodiment is described. FIG. 2 is a hardware configuration diagram of the PC according to the present embodiment. As illustrated in FIG. 2, the PC 200 of the present embodiment has a configuration similar to a general information processing terminal.

In the PC 200 according to the present embodiment, a central processing unit (CPU) 10, a random access memory (RAM) 20, a read only memory (ROM) 30, a hard disk drive (HDD) 40, and an interface (I/F) 50 are connected via a bus 80. A liquid crystal display (LCD) 60 and an operation unit 70 are connected to the I/F 50. In addition to the configuration illustrated in FIG. 2, the image forming apparatus 100 according to the present embodiment includes an engine to perform image formation.

The CPU 10 is an arithmetic means and controls the operation of the entire PC 200. The RAM 20 is a volatile storage medium which information can be read from or can be written to at a high speed and is used as a work area when the CPU 10 processes information. The ROM 30 is a non-volatile read only storage medium and stores programs, such as firmware.

The HDD 40 is a non-volatile storage medium that can read or write information and stores an operating system (OS), various control programs, and application programs etc. In the HDD 40 of the present embodiment, information to be referred to when the PC 200 executes image processing is stored. This will be described in detail later.

The I/F 50 connects the bus 80 to various hardware components or networks for control. The LCD 60 is a visual user interface for a user to confirm the state of the PC 200. The operation unit 70 is a user interface such as a keyboard or a mouse used by the user to input information to the PC 200.

In the PC 200 having such a hardware configuration, a program stored in a recording medium, such as the ROM 30, the HDD 40, or an optical disk is read into the RAM 20, and operates under the control of the CPU 10, thereby constituting a software control unit. A functional block to achieve functions of the PC 200 according to the present embodiment is constructed by a combination of the software control unit thus configured and hardware.

Figure 3:
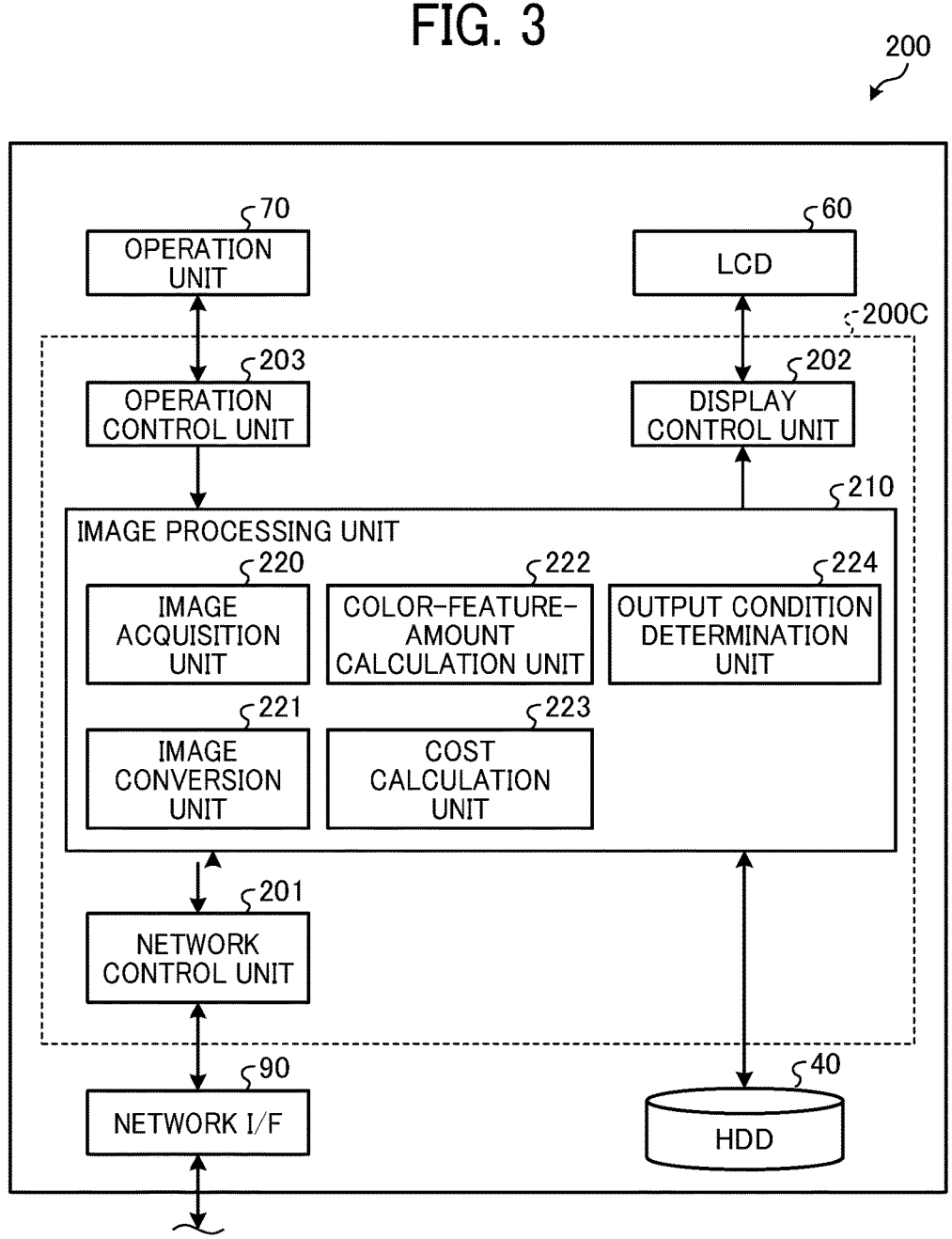
FIG. 3 is an example of a functional block diagram of the PC according to an embodiment of the present disclosure.

Next, with reference to FIG. 3, a functional configuration of the PC 200 of the present embodiment is described. FIG. 3 is an example of a functional block diagram of the PC according to the present embodiment. As illustrated in FIG. 3, the PC 200 of the present embodiment includes a controller 200C and a network I/F 90 in addition to the HDD 40, the LCD 60, and the operation unit 70 described with reference to FIG. 2. The controller 200C includes a network control unit 201, a display control unit 202, an operation control unit 203, and an image processing unit 210.

The network I/F 90 is an interface through which the PC 200 communicates with other devices via the network, and for example, Ethernet (registered trademark) or universal serial bus (USB) interface is used. The network I/F 90 is realized by the I/F 50 illustrated in FIG. 2.

The controller 200C is constructed by a combination of software and hardware. Specifically, a program that is stored in the ROM 30, a nonvolatile memory, or a non-volatile storage medium, such as the HDD 40 and an optical disc, is loaded to a volatile memory, such as the RAM 20 (hereinafter referred to as "a memory"). The controller 200C is constructed by the software control unit constructed by computation of the CPU 10 performed according to the program and hardware, such as an integrated circuit. The controller 200C is a control unit that controls the PC 200.

The network control unit 201 acquires information input via the network I/F 90 and transfers information to another apparatus via the network I/F 90. The display control unit 202 causes the LCD 60 to display the state of the PC 200, such as a graphical user interface (GUI) of the image processing unit 210. The operation control unit 203 acquires a signal of user operation on the operation unit 70 and inputs the acquired signal to the software operating in the PC 200, such as the image processing unit 210.

The image processing unit 210 is constructed by the CPU 10 performing computation according to an application program read into the RAM 20. When causing the image forming apparatus 100 to perform image formation and output, the image processing unit 210 converts the format of the image data to be output based on a plurality of output conditions and also converts the color gamut so that the color tone of the image output by the image forming apparatus 100 is more faithful to the color tone of the image data to be output. The image processing unit 210 performs the above-described conversion of the color gamut based on an output profile indicating color tone characteristics of the image formation output by the image forming apparatus 100.

The image processing unit 210 determines image data (output image data) to actually output (print), and the network control unit 201 transmits the determined output image data to the image forming apparatus 100. The image forming apparatus 100 outputs the output image data.

Here, the output condition is a condition set at the time of output in the image forming apparatus 100. It is conceivable that there is one or a plurality of candidates. When there is one candidate, the output target is directly decided. Therefore, in the following embodiment, a description is given on the premise that there are a plurality of candidates as output conditions. In addition, each output condition specifically includes, for example, the following information.

Output device: printing model, device model number, station arrangement, etc.
Productivity: setting of ppm (page per minute)/mpm (meter per minute), etc.
Print mode: one-pass printing or two-pass printing, etc.
Color material: color to be used, model number of color material, etc.
Pre-coating: presence or absence, model number of the first coating material, coating amount, etc.
Post-coating: presence or absence, model number of post-coating material, coating amount, etc.
RIP: developer, version, etc.
Resolution: frequency, etc.
Sheet: sheet type, sheet name, etc.

Figure 4:
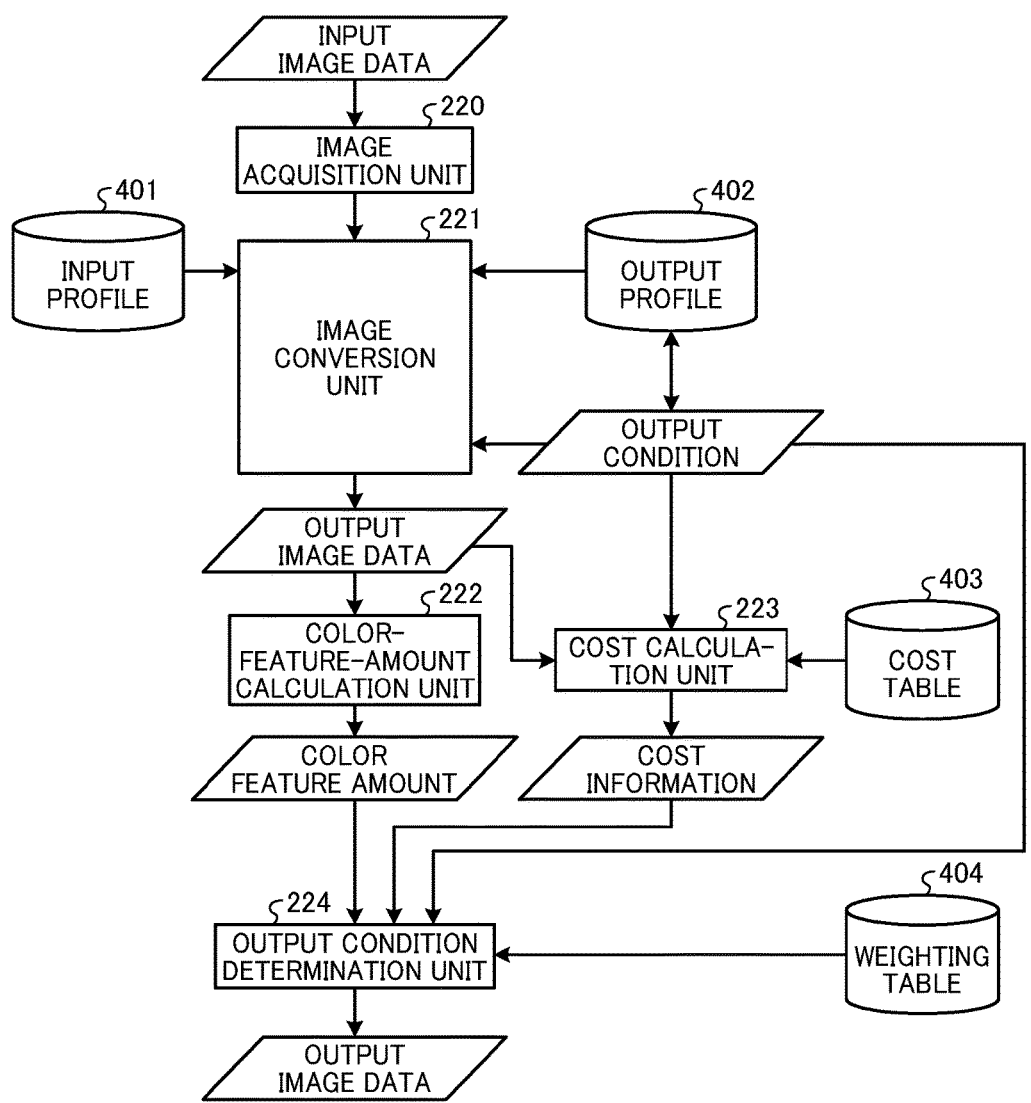
FIG. 4 is an illustration of functional blocks of an image processing unit.

FIG. 4 is an illustration of functional blocks of the image processing unit. As illustrated in FIGS. 3 and 4, the image processing unit 210 further includes an image acquisition unit 220, an image conversion unit 221, a color-feature-amount calculation unit 222, a cost calculation unit 223, and an output condition determination unit 224. Hereinafter, the outline of the image processing unit 210 is described with reference to FIG. 4. More specific contents of each unit is described from FIG. 6 et seq.

As illustrated in FIG. 4, the PC 200 of the present embodiment is provided with storage units 401, 402, 403, and 404, which are realized by the HDD 40. An input profile is stored in the storage unit 401. An output profile is stored in the storage unit 402. A cost table is stored in the storage unit 403. The storage unit 404 stores a weighting table.

The image acquisition unit 220 acquires the input image data. In the present embodiment, the image acquisition unit 220 receives input image data from the file server 300 via the network I/F 90 and the network control unit 201. Note that the acquisition of input image data is not limited to such a process and, for example, image data captured from the digital camera 400 may be acquired as the input image data.

The image conversion unit 221 converts the received input image data into an image and generates output image data corresponding to each of the plurality of output conditions. In the present embodiment, first, the image conversion unit 221 performs conversion on the input image data from input-device-dependent color space data (e.g., RGB: Red, Green, Blue) to device-independent color space data (e.g., L*a*b*) according to the input profile stored in the storage unit 401.

Here, the input profile is information for converting an image represented by the RGB color space into an image represented by the L*a*b* color space. That is, for example, the input profile of the present embodiment is a lookup table in which values of colors represented in RGB format and color values represented in L*a*b* format are associated with 1:1.

Next, according to an output profile associated with one output condition selected from the plurality of output conditions listed as candidates, the image conversion unit 221 converts the above-described device-independent color space data into device-dependent color space data (e.g., CMYK) compatible with the image forming apparatus 100 as an output device, and generates output image data.

Here, the output profile is information for converting an image represented by the L*a*b* color space into an image simply represented in the CMYK format. That is, the output profile of the present embodiment is, for example, information of a lookup table in which values of colors represented in the L*a*b* format and values of colors represented in the CMYK format are associated with 1:1.

Generally, the output profile is prepared beforehand assuming one or a plurality of output conditions, and in the present embodiment, the output profile is associated with each of a plurality of output conditions.

The color-feature-amount calculation unit 222 calculates color feature amount, which is a change amount of color feature of each pixel, from image data before and after image conversion. The color-feature-amount calculation unit 222 of the present embodiment compares the device-independent color space data before and after the color conversion process by the output profile, calculates the amount of change in color feature, and stores the data of the color feature amount. In this manner, the "effect" in determining the cost-effectiveness can be grasped by the color-feature-amount calculation unit 222. The "effect" indicates the degree of quality of the output image. Specifically, when the effect is high, the quality of the output image is high. When the effect is low, the quality of the output image is low.

The cost calculation unit 223 calculates cost information indicating the cost of the output image data corresponding to each of the plurality of output conditions, based on the output condition and the output image data. That is, the cost calculation unit 223 calculates the cost by referring to a cost table from the usage amount of color material and the information within the output condition based on the output image data, to obtain the cost information.

Here, the cost table is, for example, a table in which cost information is set corresponding to each item of the output condition. The set value may be fixed or may be edited as needed. In this manner, the "cost" for determining the cost-effectiveness can be grasped by the cost calculation unit 223.

The output condition determination unit 224 calculates the cost-effectiveness, with reference to the information of "effect" based on the color feature amount calculated by the color-feature-amount calculation unit 222, the information of "cost" based on the cost information calculated by the cost calculation unit 223, and the weighting table in which weights for items of the output condition are set.

FIGS. 5A and 5B are illustrations of examples of the weighting table. For example, as illustrated in FIG. 5A, in the weighting table, the coefficients $\alpha_1$ and $\alpha_2$ used for calculating "effect" and the weight values corresponding to the respective coefficients are stored in association with each other. Further, for example, as illustrated in FIG. 5B, coefficients $\beta_1$, $\beta_2$, $\beta_3$, $\beta_4$, $\beta_5$, $\beta_6$, $\beta_7$, $\beta_8$, and $\beta_9$ used for calculating "cost" and the weight values corresponding to the coefficients are stored in association with each other. The value of "weight value" illustrated in FIGS. 5A and 5B is an example, and an administrator and a user can redefine the value. Examples of calculation of "effect" and "cost" are described later.

Here, the weighting table is a table in which the degree of importance is set corresponding to each item of the output condition. For example, the setting values may be fixed or may be edited as needed.

With such a series of processes, it is possible to grasp the cost effectiveness against one output condition. Here, if there are other candidates for output condition, another output condition is set as a candidate, and the calculation process of cost effectiveness is repeated again.

The output condition determination unit 224 selects the output condition having the highest cost-effectiveness, determines the output image data based on the output condition as the target image to be output in the image forming apparatus 100, and obtains the output target data to be actually output. That is, for each output condition, the difference in the effect obtained by each output condition can be quantified to calculate the cost effectiveness, and the output condition can be determined based on the cost-effectiveness information. Note that cost effectiveness may be displayed and the selection of output image data by the user may be accepted to determine the output condition.

Figure 6:
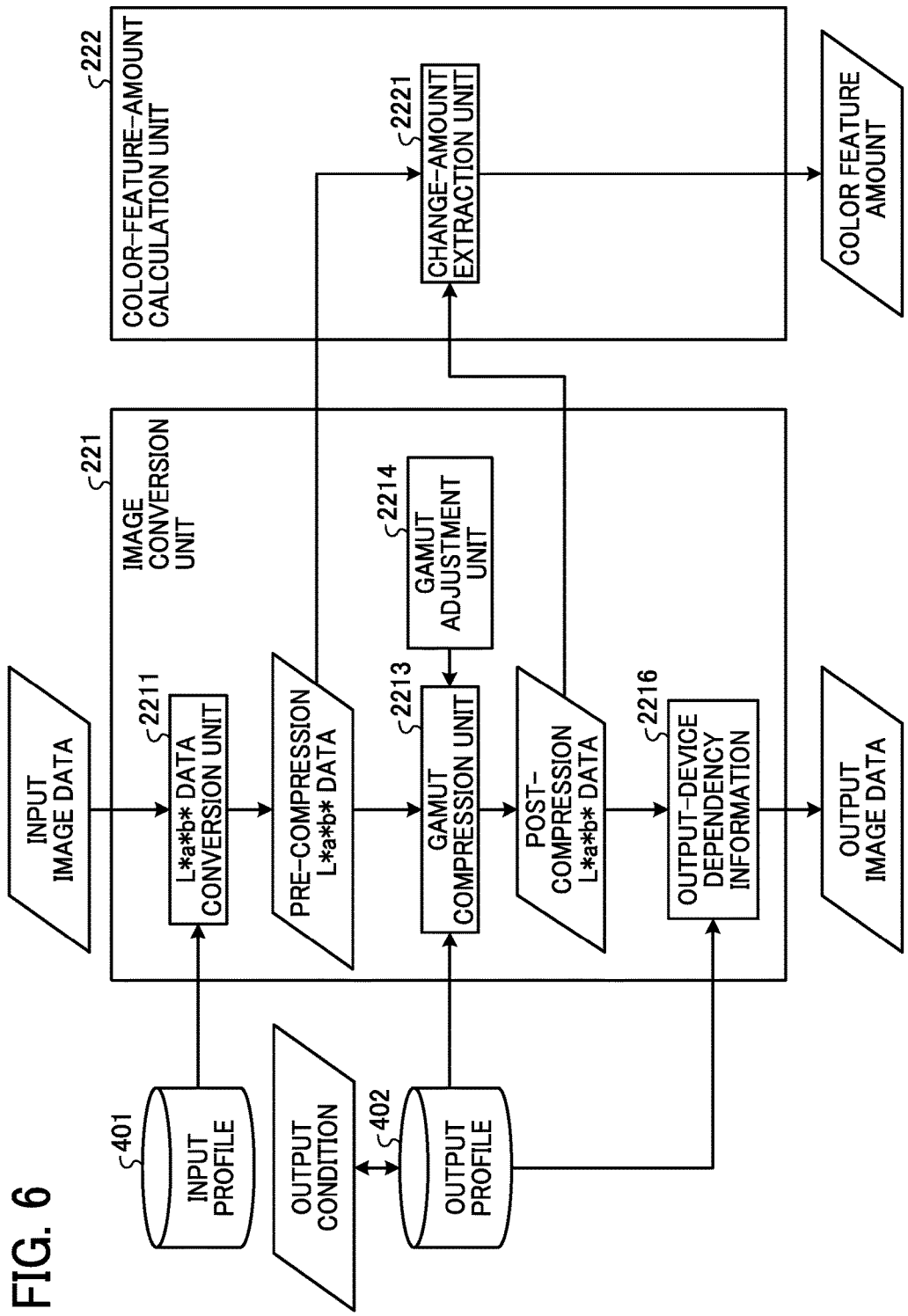
FIG. 6 is an illustration of functional blocks included in an image conversion unit and a color-feature-amount calculation unit according to an embodiment of the present disclosure.

Next, functional blocks included in the image conversion unit 221 and the color-feature-amount calculation unit 222 are described with reference to FIG. 6. FIG. 6 is an illustration of functional blocks included in the image conversion unit and the color-feature-amount calculation unit according to the present embodiment.

The image conversion unit 221 of the present embodiment further includes an L*a*b* conversion unit 2211, a gamut compression unit 2213, a gamut adjustment unit 2214, and an output-device dependent information conversion unit 2216. Further, the color-feature-amount calculation unit 222 further includes a change-amount extraction unit 2221.

First, input image data of RGB (red, green, blue) is input to the image conversion unit 221 as image data to be output. As described above, the input image data is received from the file server 300 via the network I/F 90 and the network control unit 201. Below, the data format is described by taking RGB format as an example.

The L*a*b* conversion unit 2211 converts input image data, which is device-dependent color space data on the input side, into device-independent color space data using an input profile, and serves as a first image conversion unit.

Specifically, when input image data is input to the image conversion unit 221, the L*a*b* conversion unit 2211 converts RGB input image data into L*a*B* data according to the input profile stored in the HDD 40.

Here, the L*a*b* data is data represented by the L*a*b* color space which is a numerical system of color representation according to human vision. In the present embodiment, the input image data is RGB format image data. It is not necessary to limit the input image data to RGB-format image data, but, for example, CMYK format data may be used. The input profile is the same as described above.

The L*a*b* conversion process performed by the L*a*b* conversion unit 2211 is a process of simply converting RGB format into L*a*b* format regardless of the range of colors of pixels included in RGB input image data or the color gamut that the image forming apparatus 100 can represent. The L*a*b* data generated by the L*a*b* conversion unit 2211 is device-independent L*a*b* data, and pre-compression L*a*b* data before gamut compression. The pre-compression L*a*b* data generated by the L*a*b* conversion unit 2211 is input to the gamut compression unit 2213.

The gamut compression unit 2213 gamut-compresses the pre-compression L*a*b* data according to the output profile. The gamut compression is a process to convert device-independent L*a*b* data into L*a*b* data limited to a color gamut expressible by the image forming apparatus 100 that executes image formation output, that is, device dependent L*a*b* data according to the color gamut expressible by the image forming apparatus 100.

Figure 7:
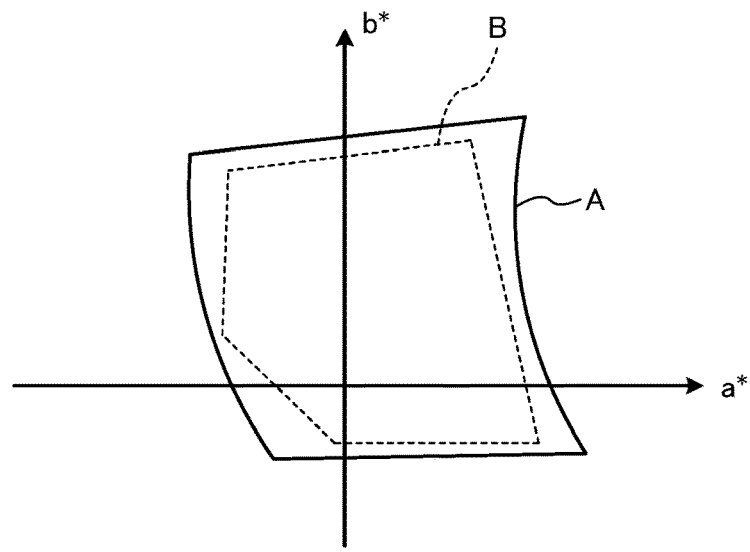
FIG. 7 is a diagram of a concept of gamut compression.

FIG. 7 is a diagram of the concept of gamut compression. As illustrated in FIG. 7, a*b* in L*a*b*, that is, a color difference component is expressed by orthogonal coordinates. In FIG. 7, a solid line A is a frame representing the device-independent L*a*b* color space, that is, the entire L*a*b* color space. A broken line B in FIG. 7 is a frame representing the color gamut reproducible by the image forming apparatus 100 in the entire L*a*b* color space.

Not only the image forming apparatus 100 but also general image forming apparatuses can not reproduce all the colors in the color space. Therefore, when an image forming apparatus executes image formation output, colors included in image data to be output are converted into a color range reproducible by the image forming apparatus. With reference to FIG. 7, the process of converting an image represented by a range indicated by the solid line A to an image represented by a range indicated by the broken line B is a gamut compression process.

The output profile is the same as described above, and the gamut compression unit 2213 gamut-compresses the pre-compression L*a*b* data by referring to a lookup table of the output profile and generates the post-compression L*a*b* data.

Further, the gamut compression unit 2213 adjusts the content of the gamut compression process in accordance with parameters input from the gamut adjustment unit 2214. The gamut adjustment unit 2214 inputs parameters to the gamut compression unit 2213 according to a signal input from the operation control unit 203 in response to a user's operation on the operation unit 70. The post-compression L*a*b* data generated by the gamut compression unit 2213 is input to the output-device dependent information conversion unit 2216.

The output-device dependent information conversion unit 2216 converts the post-compression L*a*b* data into output-device dependent information according to the output profile, thus generating output image data. Although CMYK is taken as an example of color plane data to be output-device dependent information, the color plane data is not limited to CMYK. Depending on the output condition and the output profile associated therewith, the color plane may be constructed by, for example, a multicolor play including O (orange), G (green), V (violet), or the like, in addition to CMYK.

The output image data generated by the output-device dependent information conversion unit 2216 is transmitted to the image forming apparatus 100 via the network by the network control unit 201. The image forming apparatus 100 outputs the output image data received from the PC 200.

As described above, the image conversion unit 221 according to the present embodiment adjusts the color tone of the image data exchanged in the RGB format in the information processing apparatus, such as the PC, to a reproducible color space of the image forming apparatus 100 so as to perform image formation output with more faithful color tone, and converts the adjusted image data into CMYK-format image data. Note that the gamut compression unit 2213, the gamut adjustment unit 2214, and the output-device dependent information conversion unit 2216 correspond to the second image conversion unit.

The color-feature-amount calculation unit 222 compares color values of the device-independent color space data before gamut conversion and after gamut conversion on the device-independent color space, to calculate the color feature amount.

For example, the color-feature-amount calculation unit 222 analyzes the influence of the gamut compression by the gamut compression unit 2213, and calculates the influence of the gamut compression as information indicating the quality of image quality. As illustrated in FIG. 6, pre-compression L*a*b* data and post-compression L*a*b* data generated in the process of each processing of the image conversion unit 221 are input into the change-amount extraction unit 2221 of the color-feature-amount calculation unit 222 before and after the gamut conversion.

The change-amount extraction unit 2221 compares the values of the corresponding pixel colors in the pre-compression L*a*b* data and the post-compression L*a*b* data before and after the gamut conversion, and calculates the degree of change in the color of each pixel by the gamut conversion to obtain the color feature amount.

To calculate the amount of change, the change-amount extraction unit 2221 calculates the degree of difference between the pixels of the pre-compression L*a*b* data and the pixels of the post-compression L*a*b* data before and after the gamut conversion, using a calculation formula for the degree of difference. As the calculation formula, a general color difference calculation formula can be used. In the present embodiment, to obtain the amount of change in color tone based on the L*a*b* data, a formula for obtaining the square root of the square of each element of the L*a*b* data. As another method of obtaining the amount of change in color tone, CIE 1994 color difference formula, CIE 2000 color difference formula, or the like may be used. In addition, it is also possible to grasp the magnitude of the global color expressing power by calculating the magnitude of the gamut volume after the gamut conversion.

As described above, the image processing unit 210 can generate output image data by performing image conversion using the international color consortium (ICC) profile when image conversion is performed according to each output condition. In addition, the accuracy of color conversion can be objectively checked by digitizing the difference in the device-independent color space at the time of image conversion or calculating the gamut volume.

Figure 8:
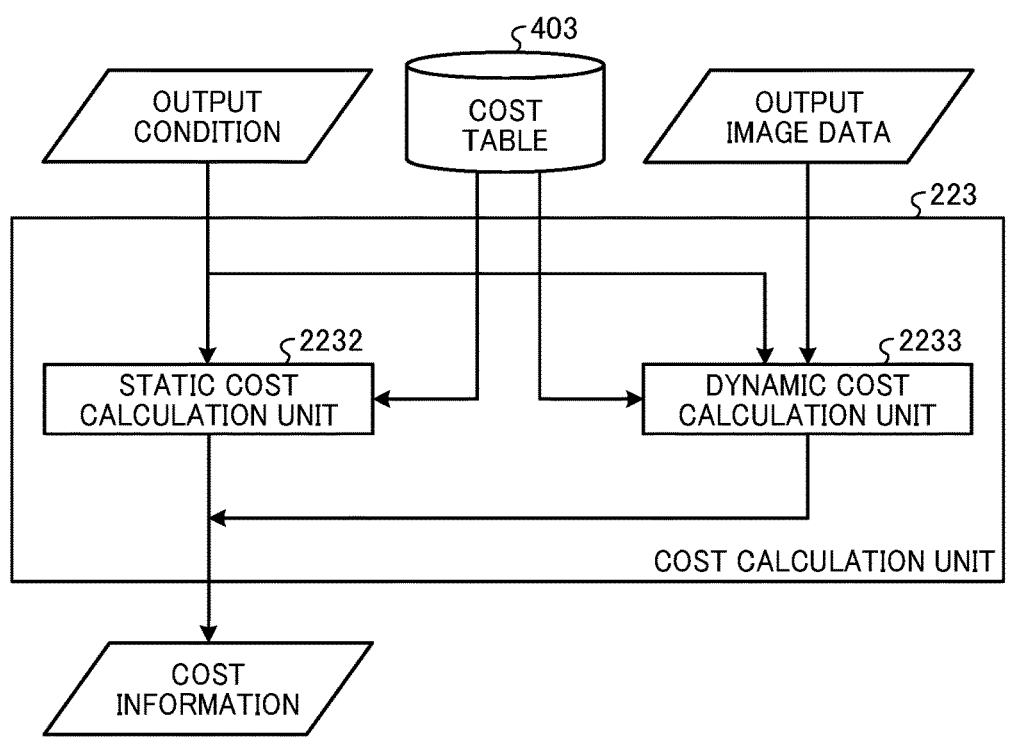
FIG. 8 is an illustration of functional blocks of a cost calculation unit according to an embodiment of the present disclosure.

Next, functional blocks of the cost calculation unit 223 are described with reference to FIG. 8. FIG. 8 is an illustration of functional blocks of the cost calculation unit according to the present embodiment.

The cost calculation unit 223 refers to the cost table in which the output condition item is associated with the cost value of the item, using the output image data generated by the image conversion unit 221 as input information, and calculates the cost information. The cost calculation unit 223 includes a static-cost calculation unit 2232 and a dynamic-cost calculation unit 2233.

The static-cost calculation unit 2232 calculates static cost information based on the cost value corresponding to the output condition not depending on the output image data. Further, the dynamic-cost calculation unit 2233 calculates dynamic cost information based on the cost value corresponding to the output condition based on the output image data. Cost information includes the static cost information and the dynamic cost information.

The output condition includes a plurality of items as described above, and the cost table is a table in which the items are associated with cost values for the items. FIGS. 9A thorough 9I are diagrams of an example of cost tables. For example, FIG. 9A illustrates a cost table of output device (model) that is an item of an output condition. In the cost table, output devices are associated with cost values when the output devices are used.

Similarly, FIG. 9B is a cost table of printing speed in which productivity as an item of the output condition is associated with cost value. FIG. 9C is a cost table of print mode in which print mode as an item of the output condition is associated with cost value.

FIG. 9D is a cost table of color material in which color material as an item of the output condition is associated with cost value. FIG. 9E is a cost table of pre-coating material in which pre-coating material as an item of the output condition is associated with cost value. In addition, FIG. 9F is a cost table of post-coating material in which post-coating material as an item of the output condition is associated with cost value.

In addition, FIG. 9G is a cost table of RIP in which RIP as an item of output condition is associated with cost value. FIG. 9H is a cost table of resolution in which resolution as an item of the output condition is associated with cost value. FIG. 9I is a cost table of paper in which paper as an item of output condition is associated with cost value.

FIGS. 10A through 10C are diagrams of calculated cost information. FIG. 10A illustrates cost information that is a reference result of cost tables. In the example of the cost information illustrated in FIG. 10A, in the case of the output condition A illustrated in the third column, the cost values acquired according to the output condition A with reference to the cost tables are illustrated in the fourth column.

FIG. 10B is an example of the static cost information. As illustrated in FIG. 10B, the item numbers of #1, #3, #7, and #8 are constant irrespective of the contents of the output image data and the number of sheets. Therefore, the static-cost calculation unit 2232 add the cost values of the items #1, #3, #7, and #8 to calculate the static cost information.

FIG. 10C is an example of the dynamic cost information. As illustrated in FIG. 10C, the items of item numbers #2, #4, #5, #6, and #9 vary depending on the contents of the output image data and the number of sheets. Therefore, the dynamic-cost calculation unit 2233 calculates the total amount of one job for each of the items of #2, #4, #5, #6, and #9 and adds the cost values to calculate the dynamic cost information. FIG. 10C illustrates an example in which there are 10 images per job.

In particular, if the amount of an item is determined depending on the content of the original data like the color material of #4, the amount is calculated by referring to the output image data. When the amount of the color material is calculated, the processing efficiency may be increased by roughly calculating the amount of color material to be used from each pixel value. Alternatively, to increase the estimation accuracy, the amount of color material may be checked in unit of dot after halftone screening process is performed.

In the example illustrated in FIGS. 10A through 10C, from the general point of view, the item numbers #1, #3, #7 and #8 are classified into the static cost information, and the item numbers #2, #4, #5, #6 and #9 are classified into the dynamic cost information. However, it is unnecessary to fix the contents of the items as illustrated in FIGS. 10B and 10C. For example, it may be calculated by treating all of the items as dynamic costs, or vice versa.

Figure 11:
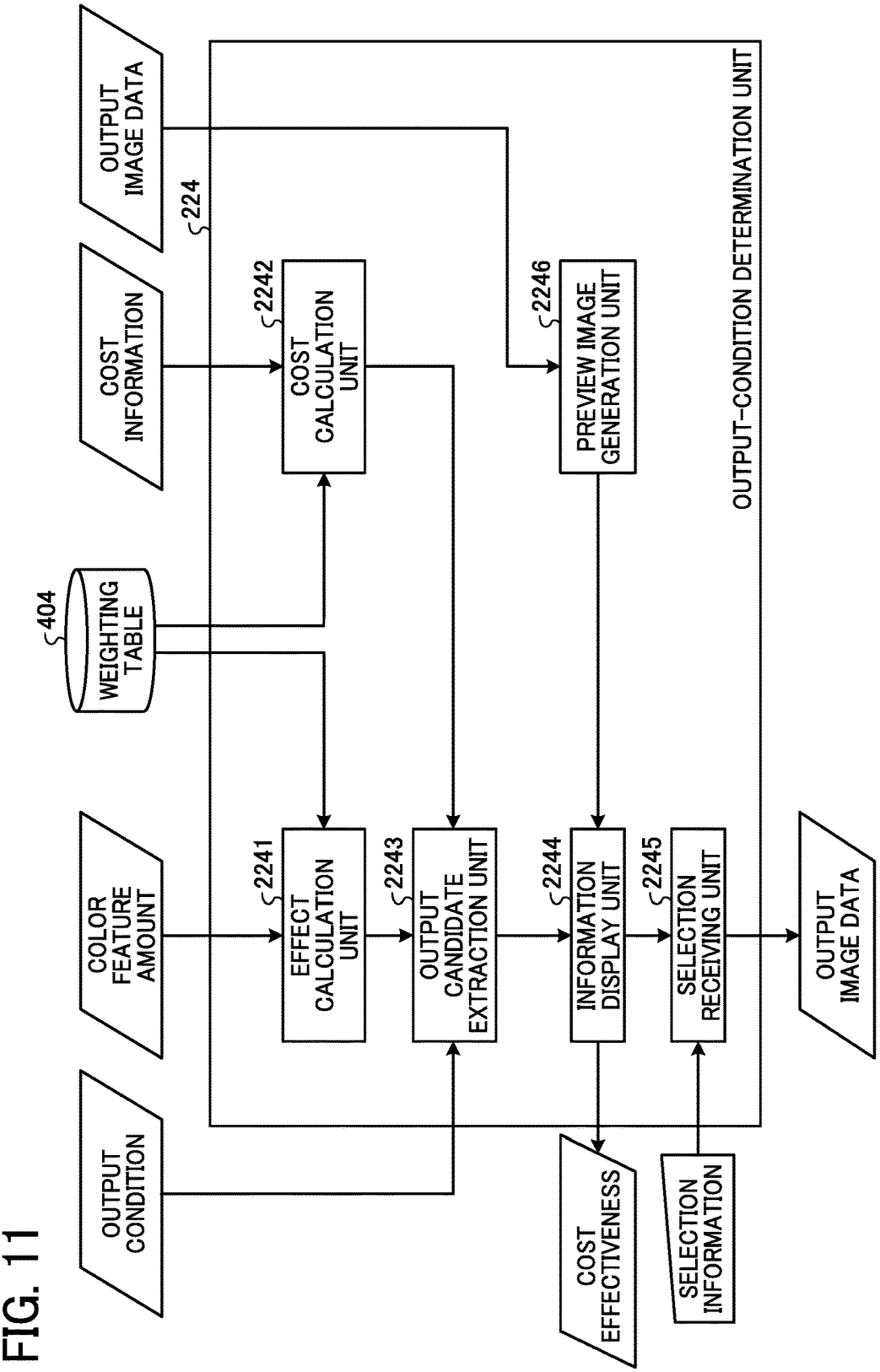
FIG. 11 is an illustration of functional blocks of an output condition determination unit according to an embodiment of the present disclosure.

Next, functional blocks of the output condition determination unit 224 is described with reference to FIG. 11. FIG. 11 is an illustration of functional blocks of the output condition determination unit according to the present embodiment. The output condition determination unit 224 calculates the cost effectiveness with reference to the weighting table using the color feature amount calculated by the color-feature-amount calculation unit 222 and the cost information calculated by the cost calculation unit 223 as input information, determines an output condition to be used for output, and obtains output image data generated based on the determined output condition. As described above, the weighting table has the importance set for each item of the output condition.

The output condition determination unit 224 of the present embodiment further includes an effect calculation unit 2241, a cost calculation unit 2242, an output candidate extraction unit 2243, an information display unit 2244, a selection receiving unit 2245, and a preview image generation unit 2246.

The effect calculation unit 2241 calculates the effect at the time of outputting the output image data by the color feature amount with reference to the weighting table illustrated in FIG. 5A. For example, the effect calculation unit 2241 calculates the effect using the following formula.

$$\text{Effect} = \alpha_1 \times 1/(\text{color difference}\Delta E) + \alpha_2 \times \text{gamut volume}$$

As described above, the data of the color feature amount is quantified in the device-independent color space, and the color reproduction accuracy is higher as the color difference $\Delta E$ is smaller. Therefore, the effect calculation unit 2241 calculates the color feature amount as the effect to calculate the magnitude of the effect. On the other hand, in the case of the gamut volume, it can be said that the larger the numerical value, the greater the effect. The effect calculation unit 2241 can also limit the color gamut of interest or attach importance to a specific color by referring to the weighting table.

The cost calculation unit 2242 refers to the weighting table illustrated in FIG. 5B and calculates the cost at the time of outputting the output image data according to the cost information. For example, the cost calculation unit 2242 calculates the cost using the following formula.

$$\text{Cost} = \beta_1 \times \text{output device} + \beta_2 \times \text{productivity} + \beta_3 \times \text{print mode} + \beta_4 \times \text{color material} + \beta_5 \times \text{pre-coating material} + \beta_6 \times \text{post-coating material} + \beta_7 \times \text{RIP} + \beta_8 \times \text{resolution} + \beta_9 \times \text{sheet}$$

Since the data of the cost information is quantified as described above, the cost calculation unit 2242 calculates the magnitude of the cost with the magnitude of the numerical value. The cost calculation unit 2242 can limit the item of interest or attach importance to a specific item by referring to the weighting table.

The output candidate extraction unit 2243 divides the effect calculated by the effect calculation unit 2241 by the cost calculated by the cost calculation unit 2242 (effect/cost), calculates the cost effectiveness in each of the output conditions, and lists as candidates. Here, the output candidate extraction unit 2243 determines the output image data converted with the most cost-effective output condition from the candidates as the output target data to be output in the image forming apparatus 100.

As described above, by using the weighting table, for example, it is possible to give a bias in the handling of the color difference calculated according to the degree of importance of the pixel of interest in the color feature amount (for example, a bias that yellow component is not cared even if the color difference is large) or give a bias in importance of color materials in the cost information (for example, a bias that, since the inventory of K ink is large, it is not added to the calculation result). The cost effectiveness can be calculated in consideration of the user's convenience.

The information display unit 2244 displays various types of information, such as a plurality of output conditions, cost effectiveness for each of the plurality of output conditions, and a preview image generated by the preview image generation unit 2246. The information display unit 2244 converts various types of information into screen display data and displays the screen display data on the LCD 60 via the display control unit 202 to provides the screen display data to the user.

Here, the screen display data is, for example, information on color reproduction accuracy by color difference $\Delta E$ with respect to each output condition, information on gamut volume, or cost information. Further, the image display data may be displayed as a list of set of calculation results of "effect/cost" as a result of weighting by the weighting table. Also, taking into consideration the possibility that users are confused by increasing the number of set of calculation results, for example, the calculation results may be displayed in order of cost effectiveness ("effect/cost") or sorted by item on the GUI, or a range value may be set so that screening can be performed.

Note that, when the weighting table itself is reset based on the determination made by the user, the output candidate extraction unit 2243 may be configured to redo the series of processes until the result is obtained.

Further, the output target data to be output by the image forming apparatus 100 may be determined by the user. That is, when the user to whom the above-described image display data (a plurality of output conditions and cost effectiveness for the plurality of output conditions) is presented selects an output condition to be used for output by the image forming apparatus 100 from a group of output condition candidates, the selected output condition is input to the selection receiving unit 2245 as selection information via the operation control unit 203 by using the operation unit 70.

The selection receiving unit 2245 receives selection of a desired output condition from the user among the plurality of output conditions displayed by the information display unit 2244. The selection receiving unit 2245 determines the output image data based on selection by the selection information.

The preview image generation unit 2246 generates the preview image, using the output image data corresponding to each of the plurality of output conditions converted by the image conversion unit 221 as input information. The generated preview image is displayed via the display control unit 202 by the information display unit 2244. The preview image is presented to the user together with the set of calculation results of cost effectiveness (effect/cost).

Figure 12:
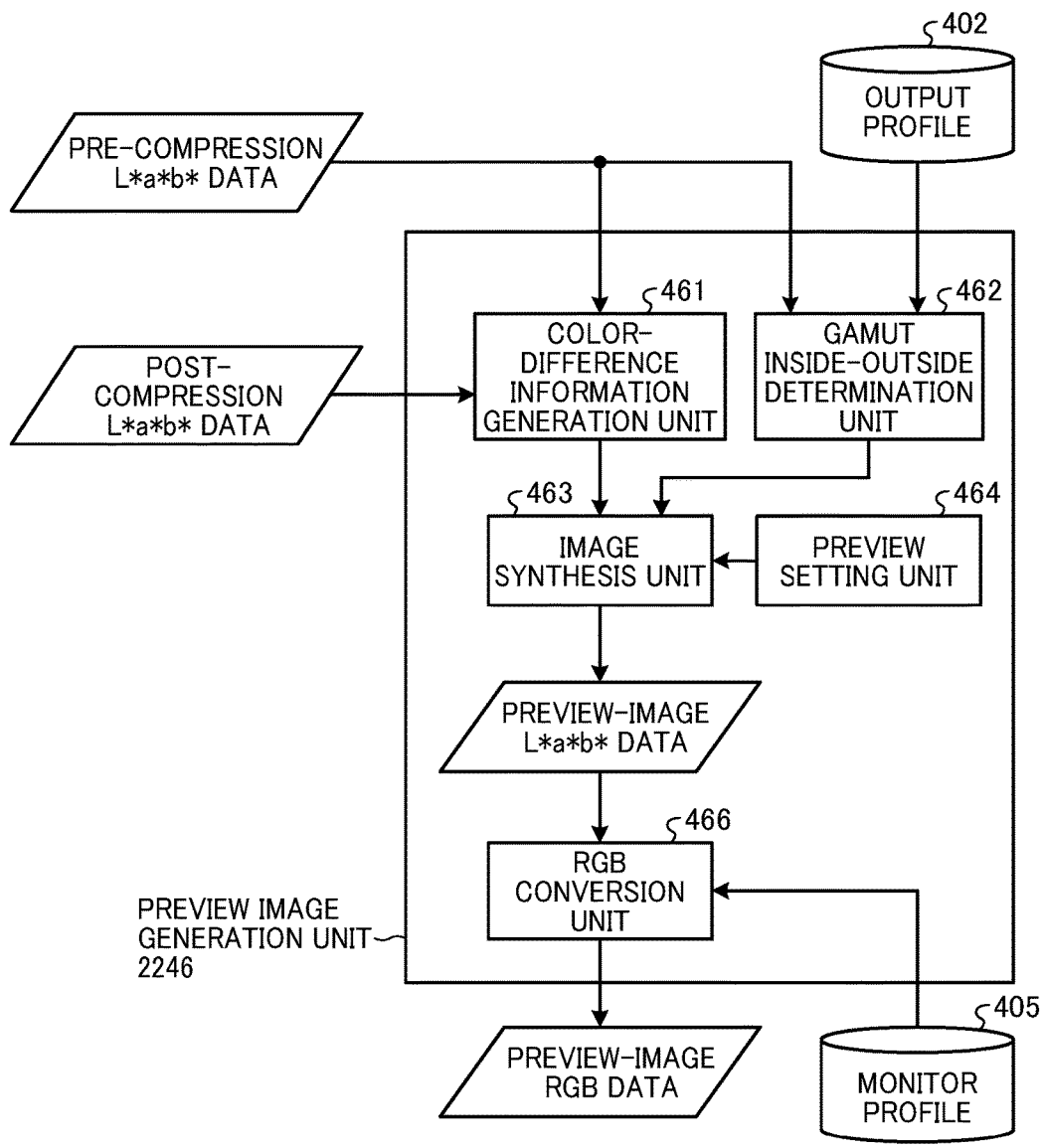
FIG. 12 is an illustration of functional blocks of a preview image generation unit according to the present embodiment.

Next, functional blocks of the preview image generation unit 2246 are described with reference to FIG. 12. FIG. 12 is an illustration of functional blocks of the preview image generation unit according to the present embodiment. The preview image generation unit 2246 further includes a color-difference information generation unit 461, a gamut inside-outside determination unit 462, an image synthesis unit 463, a preview setting unit 464, and an RGB conversion unit 466. The PC 200 further includes a storage unit 405 in which monitor profiles are stored.

The preview image generation unit 2246 analyzes the influence of gamut compression by the gamut compression unit 2213 and generates a screen so that the user can easily recognize the influence. As illustrated in FIG. 12, the pre-compression L*a*b* data and the post-compression L*a*b* data generated by the processes of the image conversion unit 221 are into the color-difference information generation unit 461 of the preview image generation unit 2246, and the pre-compression L*a*b* data and the output profile are input to the gamut inside-outside determination unit 462.

The color-difference information generation unit 461 compares the color values of pixels corresponding to the pre-compression L*a*b* data and the post-compression L*a*b* data, determines the amount of change in color of each pixel by the gamut conversion, and converts the amount of change into color difference information. The color-difference information generation unit 461 generates color-difference image data in which each pixel constituting the output image data is composed of the color difference information.

The color-difference information generation unit 461 performs calculation based on a calculation formula for calculating the degree of difference between the pixels of the pre-compression L*a*b* data before compression and the pixels of the post-compression L*a*b* data. As the calculation formula, a general color difference calculation formula can be used. In the present embodiment, a formula to find the square root of the square of each element of the L*a*b* data can be used to obtain the change amount of color tone based on the L*a*b* data. As another method of obtaining the amount of change in color tone, CIE 1994 color difference formula, CIE 2000 color difference formula, or the like may be used.

Based on the pre-compression L*a*b* data and the output profile, the gamut inside-outside determination unit 462 determines whether the pixels constituting the output image data are colors reproducible in the image forming apparatus 100, generates flag information indicating whether color in each pixel is reproducible, and generates color-reproduction impossible region data indicating at least a color-reproduction impossible region among the pixels constituting the output image data.

The image synthesis unit 463 converts the color-difference image data generated by the color-difference information generation unit 461 and the color-reproduction impossible region data generated by the gamut inside-outside determination unit 462 into images, synthesize the images, and generates preview-image L*a*b* data indicating which part of the output image data changes in color. In accordance with the parameters input from the preview setting unit 464, the image synthesis unit 463 adjusts the content of processing when generating the preview-image L*a*b* data. The preview setting unit 464 inputs parameters to the image synthesis unit 463 according to a signal input from the operation control unit 203 in accordance with an operation on the operation unit 70 by the operator.

Figure 13A:
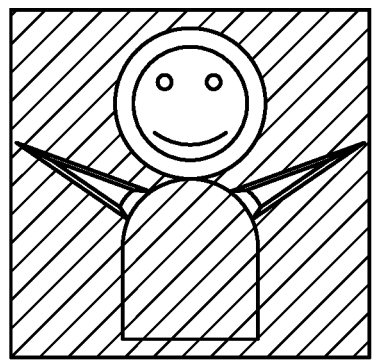
FIGS. 13A and 13B are illustrations of examples of a preview image.
Figure 13B:
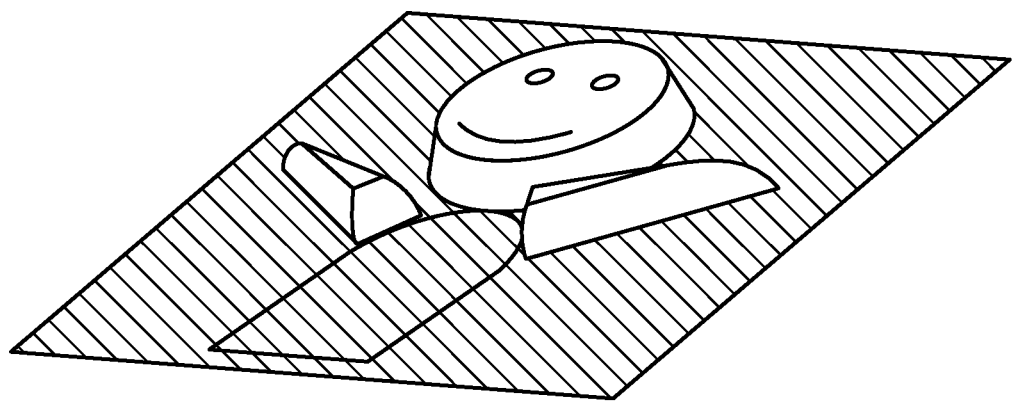

The parameter is information that defines in what format the preview-image L*a*b* data is displayed. The parameter can be reflected in the preview-image L*a*b* through processing in the image synthesis unit 463 by setting how to synthesize images, for example, highlighting a portion with a large color difference based on the color-difference image data to display a two-dimensional (2D) image as illustrated in FIG. 13A or handling the color-difference image data as contour line-like data to display a three-dimensional (3D) image as illustrated in FIG. 13B. The preview-image L*a*b* data thus generated is input to the RGB conversion unit 466.

With reference to a monitor profile, the RGB conversion unit 466 converts the L*a*b* format data into RGB format data according to the color representation characteristics of the LCD 60 of the PC 200, thus generating preview-image RGB data. That is, the RGB conversion unit 466 converts a preview image generated based on, e.g., pre-compression L*a*b* data represented by a device-independent color space into RGB data represented on a color space that the LCD 60 of the PC 200 can represent.

Here, the monitor profile stored in the storage unit 405 is information of a lookup table in which the values of colors represented by the device-independent L*a*b* format are associated with the values of colors of the RGB color space limited to the color gamut that the LCD 60 can represent. Generally, the monitor profile is designed in advance and provided in association with the LCD 60 and is actually stored in, for example, the HDD of the PC 200 as an entity.

As described above, in the present embodiment, the image information generated by the image synthesis processing by the image synthesis unit 463 is displayed through the processing by the RGB conversion unit 466. That is, the image synthesis unit 463 and the RGB conversion unit 466 work together to function as a preview-image generation unit.

The preview-image RGB data generated and output as described above is input to the display control unit 202. The display control unit 202 controls the LCD 60 to display the preview image RGB data input from the image processing unit 210.

That is, as described above, the cost effectiveness in each output condition is displayed (presented) to the user, and the output condition is decided by selection by the user. Thus, the user is convinced in advance and the output image data can be output. Furthermore, it is possible for the user to visually confirm the magnitude of the color value to be changed by the gamut conversion processing. Therefore, it is possible for the user to efficiently and objectively grasp the cost effectiveness without performing trial printing.

Figure 14:
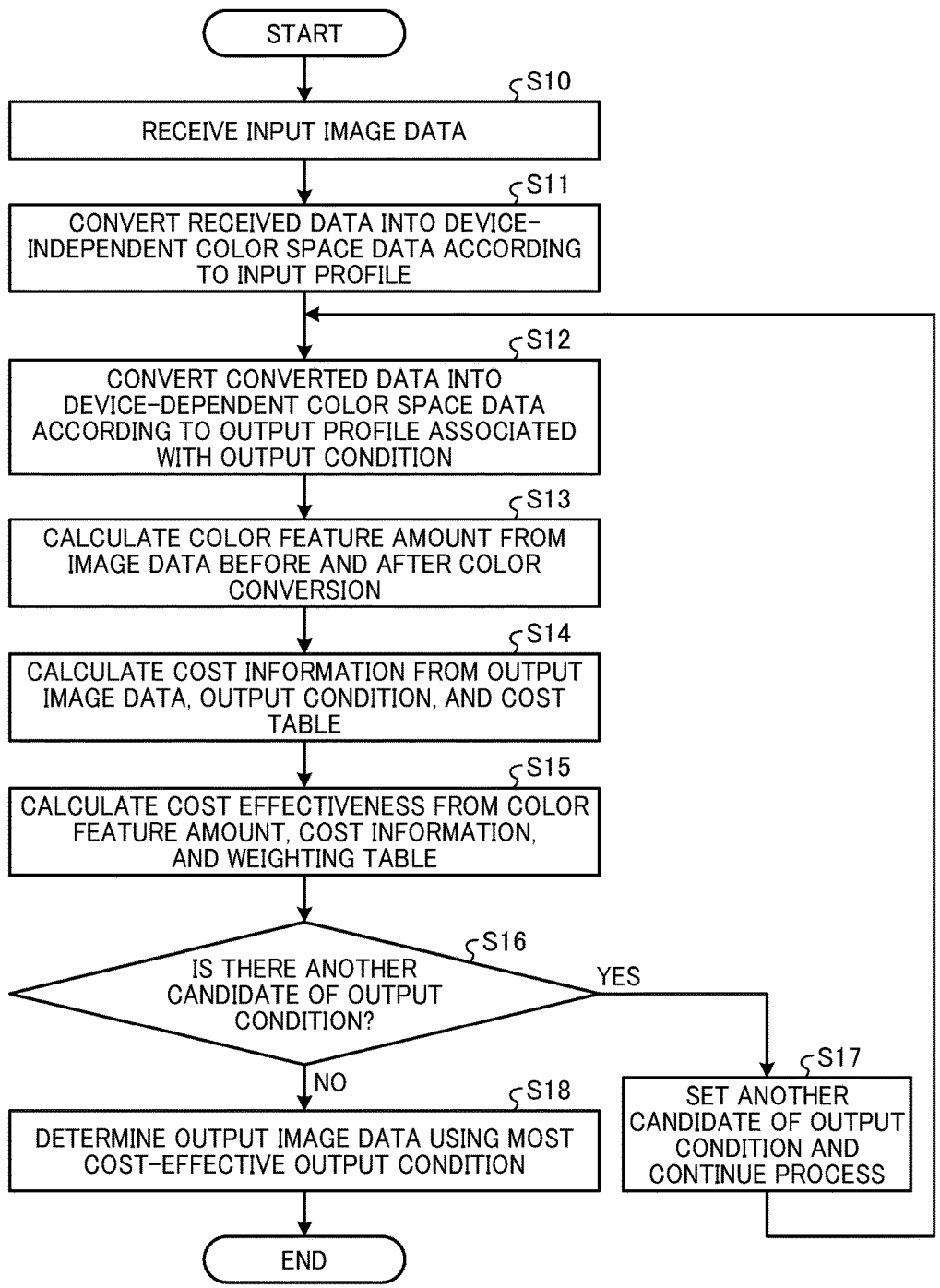
FIG. 14 is a flowchart of a flow of processing of determining output image data.

Next, a flow of processing of determining output image data, which is a target image to be output in the image forming apparatus 100, is described below. FIG. 14 is a flowchart of the flow of processing of determining output image data.

As illustrated in FIG. 14, first, the image acquisition unit 220 receives (acquires) input image data from the file server 300 via the network (step S10). The image conversion unit 221 converts the input image data into device-independent color space data (for example, L*a*b* data) according to an input profile (step S11).

Next, the image conversion unit 221 converts the device-independent color space data into device-dependent color space data (for example, CMYK data) according to an output profile associated with an output condition (step S12). The color-feature-amount calculation unit 222 calculates color feature amounts from image data before and after color conversion (before and after gamut compression) (step S13).

Next, the cost calculation unit 223 calculates cost information from the output image data, the output condition, and a cost table (step S14). That is, with reference to the cost table, the cost calculation unit 223 obtains cost information from the amount of color material used by the output image data and information within the output condition.

Next, the output condition determination unit 224 calculates cost effectiveness from the color feature amount, the cost information, and the weighting table (step S15). That is, the output condition determination unit 224 calculates cost effectiveness with reference to the information of "effect" by the color feature amount, the information of "cost" based on the calculated cost information, and the weighting table in which the weights for the items of output condition are set.

The output condition determination unit 224 determines whether there is another output condition candidate (step S16). If there is another output condition (YES in step S16), the output condition determination unit 224 sets the another candidate to the output condition and continues the process (step S17). The process returns to step S12 and the processing from step S12 is repeated.

On the other hand, when there is no other output condition (NO in step S16), the output image data using the calculated output condition with the highest cost-effectiveness is determined as the image data to be output in the image forming apparatus 100 (step S18).

For example, in an environment like "printing factory" in which there is a plurality of output conditions to be combined at the time of printing and there is a wide variety of options of the output condition, it is desirable to grasp the level of the image quality as an effect as well as the cost. As described above, since the image processing system 1 according to the present embodiment can quantify the difference in the effect obtained with respect to the output condition and can grasp the cost effectiveness, the output image data using a desired output condition can be determined based on the cost effectiveness.

A program to be executed on the PC 200 according to the present embodiment is recorded and provided in a computer-readable recording medium, such as a compact disc-read only memory (CD-ROM), a flexible disk (FD), a compact disc-recordable (CD-R), or a digital versatile disk (DVD), in a file in installable or executable format.

The program executed by the PC 200 according to the present embodiment may be stored on a computer connected to a network, such as the Internet, and provided so as to be downloaded via the network. Further, the program executed by the PC 200 according to the present embodiment may be provided or distributed via a network, such as the Internet.

Further, the program executed by the PC 200 according to the present embodiment may be configured to be provided by being incorporated in advance in a ROM or the like. The program executed by the PC 200 according to the present embodiment has a module configuration including each of the above-described units (the image acquisition unit, the image conversion unit, the color-feature-amount calculation unit, the cost calculation unit, the output condition determination unit). As an actual hardware, a CPU (processor) reads the program from the recording medium and executes the program to load each of the above-described units on a main memory, and each unit is generated on the main memory. For example, a part or all of the functions of the above-described units may be implemented by a dedicated hardware circuit.

Although some embodiments of the present disclosure have been described above, the above-described embodiments are presented as examples, and are not intended to limit the scope of the invention. The above-described embodiments can be implemented in various other forms, and various omissions, substitutions, changes, and combinations can be made without departing from the gist of the invention. Such embodiments and variations thereof are included in the scope and gist of the invention and are included in the invention described in claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus, comprising:
   circuitry configured to
     acquire input image data;
     perform image conversion on the input image data to generate output image data corresponding to each of a plurality of output conditions;
     calculate a color feature amount that is a change amount of color characteristics of each pixel from the input image data and the output image data before and after the image conversion;
     calculate cost information indicating a cost of the output image data corresponding to each of the plurality of output conditions, based on the plurality of output conditions and the output image data; and
     calculate a cost effectiveness with reference to the color feature amount, the cost information, and a weighting table in which weights for items of the plurality of output conditions are set, to determine one output condition of the plurality of output conditions to be used for output,
   wherein the circuitry is further configured to refer to a cost table in which at least one item of the items of the plurality of output conditions is associated with a cost value of the at least one item and calculate, as the cost information, static cost information based on a cost value corresponding to an output condition not depending on the output image data and dynamic cost information based on a cost value corresponding to an output condition depending on the output image data.

2. The image processing apparatus according to claim 1, wherein the circuitry is further configured to convert the input image data, which is input-side device-dependent color space data, into device-independent color space data using an input profile and convert the device-independent color space data into the output image data that is output-side device-dependent color space data using an output profile.

3. The image processing apparatus according to claim 2, wherein the circuitry is further configured to perform gamut conversion on the device-independent color space data, based on each of a plurality of output profiles, and generate a plurality of pieces of output image data.

4. The image processing apparatus according to claim 3, wherein the circuitry is further configured to compare color values of the device-independent color space data before the gamut conversion and after the gamut conversion on the device-independent color space to calculate the color feature amount.

5. The image processing apparatus according to claim 4, wherein the circuitry is further configured to calculate an effect of outputting the output image data, based on the color feature amount with reference to the weighting table,
calculate a cost of outputting the output image data, based on the cost information with reference to the weighting table,
calculate the cost effectiveness by dividing the effect by the cost, and
determine, from a magnitude of the cost effectiveness, the one output condition to be used for output.

6. The image processing apparatus according to claim 5, wherein the circuitry is further configured to cause display of the cost effectiveness for each of the plurality of output conditions on a display, and receive selection of an output condition from the plurality of output conditions through the display.

7. The image processing apparatus according to claim 6, wherein the circuitry is further configured to generate a preview image based on the output image data corresponding to each of the plurality of output conditions, and cause display of the preview image on the display.

8. An image processing system, comprising:
an image output apparatus; and
an image processing apparatus that generates output image data to be output by the image output apparatus,
the image processing apparatus comprising
circuitry configured to
acquire input image data;
perform image conversion on the input image data to generate the output image data corresponding to each of a plurality of output conditions;
calculate a color feature amount that is a change amount of color characteristics of each pixel from the input image data and the output image data before and after the image conversion;
calculate cost information indicating a cost of the output image data corresponding to each of the plurality of output conditions, based on the plurality of output conditions and the output image data; and
calculate a cost effectiveness with reference to the color feature amount, the cost information, and a weighting table in which weights for items of the plurality of output conditions are set, to determine one output condition of the plurality of output conditions to be used for output, and
the image output apparatus being configured to receive the output image data from the image processing apparatus and output the output image data received from the image processing apparatus,
wherein the circuitry is further configured to refer to a cost table in which at least one item of the items of the plurality of output conditions is associated with a cost value of the at least one item and calculate, as the cost information, static cost information based on a cost value corresponding to an output condition not depending on the output image data and dynamic cost information based on a cost value corresponding to an output condition depending on the output image data.

9. A non-transitory recording medium storing an image processing program to cause a computer to execute a method comprising:
acquiring input image data;
performing image conversion on the input image data to generate output image data corresponding to each of a plurality of output conditions;
calculating a color feature amount that is a change amount of color characteristics of each pixel from the input image data and the output image data before and after the image conversion;
calculating cost information indicating a cost of the output image data corresponding to each of the plurality of output conditions, based on the plurality of output conditions and the output image data; and
calculating a cost effectiveness with reference to the color feature amount, the cost information, and a weighting table in which weights for items of the plurality of output conditions are set, to determine one output condition of the plurality of output conditions to be used for output,
wherein the method further comprises referring to a cost table in which at least one item of the items of the plurality of output conditions is associated with a cost value of the at least one item and calculating, as the cost information, static cost information based on a cost value corresponding to an output condition not depending on the output image data and dynamic cost information based on a cost value corresponding to an output condition depending on the output image data.

* * * * *